Patented Aug. 9, 1932

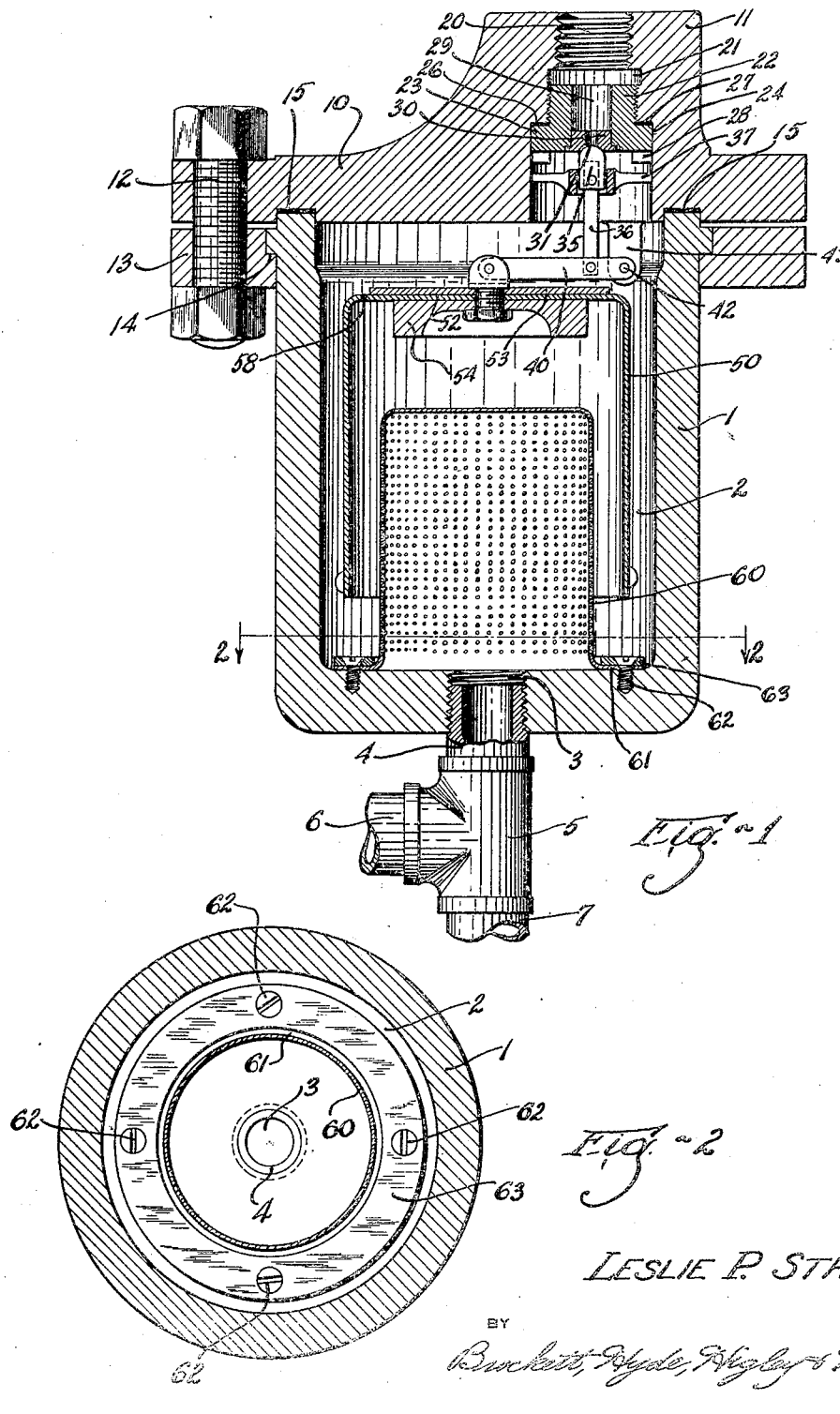

1,870,660

UNITED STATES PATENT OFFICE

LESLIE P. STRONG, OF LAKEWOOD, OHIO, ASSIGNOR TO THE CLARK MANUFACTURING COMPANY, OF CLEVELAND, OHIO, A CORPORATION OF OHIO

STEAM TRAP

Application filed March 14, 1931. Serial No. 522,584.

This invention relates to improvements in steam traps, such as are used with steam containing appliances for removing therefrom air and water of condensation, but preventing the escape therefrom of steam.

These steam traps have an inlet for steam, water and air and an outlet through which the water and air are discharged, said outlet being controlled by a valve actuated by a float bucket arranged in the trap and on which bucket is effective the water, steam and air entering the trap.

It has been found that dirt, bits of metal and other foreign particles entering the trap with water, air and steam frequently prevent proper operation of the trap by becoming lodged between the trap outlet valve and its seat, preventing said valve from fully closing. Sometimes, improper trap operation results by these particles scratching and/or otherwise damaging either the valve itself or its seat, or both.

It is therefore the general object of the present invention to provide a steam trap having a simple yet effective strainer arranged within the trap, adjacent its inlet, for preventing foreign particles entering the trap from reaching the trap outlet valve and its seat. More particularly, it is the object of this invention to provide a steam trap in which the trap inlet pipe has also associated therewith the trap "blow-off" pipe by means of which the trap is cleaned. By such an association of the trap strainer and the trap "blow-off" pipe, dirt, bits of metal and other particles entering the trap and collecting within the strainer are removed from within the strainer and hence from within the trap by the "blow-off" operation.

The straining device of the present trap is therefore located within the trap, rather than within the inlet pipe, and yet, it is not necessary to disassemble the trap to clean said straining device.

The present invention will be more readily understood, and further advantageous features thereof will be apparent from the following description thereof, reference being had to the accompanying drawing in which Fig. 1 is a central vertical sectional view of the present improved steam trap; and Fig. 2 is a cross sectional view on the line 2—2, Fig. 1.

The trap illustrated includes a generally cup-shaped metal casing 1, open at its top and having a generally cylindrical chamber 2 into which steam, water of condensation and air enter through the centrally disposed bottom inlet 3. Threaded or otherwise suitably secured in said opening is a pipe 4 having secured to its lower end the upper end of a T-coupling 5, to the lateral opening of which is connected a pipe 6, said pipes 4 and 6 and said coupling 5 constituting the trap inlet conduit. Secured to the lower end of the coupling 5 is a pipe 7 which constitutes the trap "blow-off" pipe.

The chamber 2 of the trap casing is closed at the top by a metal cover 10 of generally circular shape in plan view and provided with a slightly off-center, generally cylindrical upright extension 11. The marginal portion of said cover is bolted or otherwise suitably connected, as at 12, to a horizontally disposed, annular metal flange 13 shrunk upon or otherwise suitably secured to the top of the trap casing 1, said casing at its top and said flange having annular interlocking shoulders 14. For sealing purposes, an annular gasket 15 is preferably interposed between the cover 10 and the top of the trap casing 1.

The cover 10 and the cover extension 11 are together provided with a vertically disposed through-passageway, the upper and smallest portion 20 of which is threaded to receive the trap discharge or outlet pipe (not shown). The intermediate portion 21 of said passageway is also threaded and has secured therein the upper end portion 22 of a hard metal bushing, the lower enlarged end 23 of which lies within the lower, enlarged and unthreaded portion 24 of said cover and cover extension passageway. Said bushing is screwed up into said passageway until the upper annular surface of its lower enlarged end 23 engages the annular shoulder 26 formed by the enlargement of said cover and cover extension passageway. If desired, an annular sealing gasket 27 may be interposed between said cover shoulder 26 and the enlarged lower end 23 of the bushing, all as clearly shown in Fig. 1. For turning said bushing, diametrically opposed depending lugs 28 are provided on the bottom thereof.

Shrunk into or otherwise suitably secured in the lower end of the vertically disposed passageway 29 of said bushing is an exceptionally hard metal valve seat member 30 having a centrally disposed, vertically extending opening 31 therethrough. This opening constitutes the outlet opening of the trap and through which passes, therefore, the water and air discharged from the trap.

This trap outlet opening 31 is controlled by a valve 35 pinned or otherwise suitably mounted upon the upper end of a generally vertically disposed valve stem 36. For guiding said valve in its vertical movement within the lower, unthreaded portion 24 of the cover and cover extension passageway, radially extending arms 37 are provided, said valve moving into and out of engagement with the valve seat member 30.

The lower end of the valve stem 36 is pinned or otherwise suitably connected to a lever 40, intermediate the ends of said lever, said lever being arranged in generally horizontal position at the top of the trap chamber 2. The outer end of said lever is pivotally mounted at 42 to a casing lug 43 arranged within the trap chamber 2 at the top thereof, while the inner end of said lever, which end terminates substantially on the central axis of the trap, has suitably mounted thereon an inverted float bucket 50, the movement of which in the trap chamber 2 controls the movement of the valve 35 and hence the opening and closing of the trap outlet opening 31. The connection of said lever 40 to said bucket is at substantially the center of the top wall 52 of said bucket and to make this connection a firm one and to give said bucket the desired weight, a metal disk 53 and a generally circular metal block 54 are respectively arranged above and below the top wall 52 of said bucket, as clearly shown in Fig. 1.

In the operation of the present trap, water, steam and air enter the trap chamber 2, from the steam appliance (not shown) to which the trap is connected, through the inlet conduit formed by the pipes 4 and 6 and the coupling 5 therebetween. So long as there is sufficient steam and/or air within the inverted trap bucket 50 to maintain said bucket in elevated position, as shown in Fig. 1, the trap outlet opening 31 is closed by the bucket operated valve 35. Due to the escape of air within the trap bucket through the vent orifice 58 in the bucket top wall 52, and the condensing of steam within said bucket, the buoyant effect upon said bucket of steam and/or air at times becomes insufficient to maintain said bucket in an elevated position. Said bucket thereupon falls with consequent opening of the trap outlet 31. Water and air are thereupon discharged from the trap and said outlet opening is maintained in open position until sufficient steam and/or air enter the trap to raise the trap bucket 50 and thus bring about the closing by the valve 35 of the trap outlet opening 31.

It has been found that the dirt, particles of metal and other foreign matter entering the trap chamber 2 with the water, steam and air frequently cause improper trap operation by becoming lodged between the valve 35 and its seat on the valve seat member 30, said valve being thus prevented from fully closing the trap outlet opening 31. Moreover, the valve and/or its seat are sometimes scratched or otherwise damaged by these foreign particles, with consequent improper trap operation.

To prevent foreign particles entering the trap chamber from reaching the valve mechanism of the trap, and thus interfering with the proper operation of said mechanism, the present trap is provided within its chamber 2 and overlying its inlet opening 3 with a simple yet effective strainer having openings sufficiently small to prevent damaging particles from passing therethrough. The strainer here shown is a one-piece metal member having an inverted cup-shaped body portion 60 and an outwardly extending annular base portion 61 adapted to rest upon and be suitably secured to the bottom wall of the trap casing. A series of circumferentially disposed screws 62 are here used for securing the strainer base portion to the trap casing bottom wall, and to provide a more durable construction and a more sturdy connection of the strainer base portion to the trap casing bottom wall, an annular metal ring 63 overlies and rests upon said strainer base portion 61 and into this ring the heads of screws 62 are countersunk.

While the body portion of the present strainer may be of any suitable height and of any suitable diameter, it is here shown as having a height slightly greater than half the depth of the trap chamber 2 and as having a diameter slightly greater than half the diameter of said trap chamber. The body portion of said strainer therefore extends into the inverted trap bucket 50 an appreciable distance, but the movement of said trap bucket is in no way disturbed by said strainer body portion.

Foreign particles entering the trap chamber 2 with the incoming water, steam and air are collected within the body portion 60 of the strainer and are thus prevented from reaching the valve mechanism of the trap.

Steam traps of this character are provided with "blow-off" pipes for cleaning out their chambers. As before mentioned, the "blow-off" pipe 7 of the present trap is connected to the trap inlet conduit, adjacent the trap inlet opening 3.

The cleaning out of the trap chamber 2 is effected when said chamber is full of steam. The trap inlet pipe 6 is closed and the "blow-off" pipe 7 is opened, with the result that the steam in said chamber rushes out through the inlet opening 3, the pipe 4, the coupling 5 and the "blow-off" pipe 7. All foreign particles collected within the inverted cup-shaped body portion 60 of the strainer are picked up by this out-rushing steam and are carried away with it. Therefore, not only is the trap chamber 2 cleaned out by this "blow-off" operation, but also the trap strainer is effectively cleaned. There is, therefore, no necessity of disassembling the trap to clean the strainer.

Further features of the present invention will be apparent to those skilled in the art to which it relates.

What I claim is:

1. A steam trap, comprising a chambered casing structure having an inlet opening in the bottom wall thereof and through which steam and water enter the chamber of said casing structure, said casing structure being also provided with an outlet opening through which water leaves said chamber, valve mechanism for controlling the flow of water through said outlet opening, an inverted substantially cup-shaped bucket arranged within said chamber for actuating said valve mechanism, and a strainer for said inlet opening arranged within said chamber and having an inverted generally cup-shaped body portion extending into the space within said bucket and also having an annular base portion secured to said casing structure bottom wall around the inlet opening thereof.

2. A steam trap, comprising a chambered casing structure having an inlet opening and an outlet opening, an inlet conduit secured within said inlet opening for delivering steam and water into the chamber of said casing structure, a blow-off pipe connected to said inlet conduit, valve mechanism for controlling the flow of water through said outlet opening, an inverted substantially cup-shaped bucket arranged within said chamber for actuating said valve mechanism, and a strainer for said inlet opening arranged within said chamber and having an inverted generally cup-shaped body portion extending into the space within said bucket and also having an annular base portion secured to said casing structure bottom wall around the inlet opening thereof.

3. A steam trap, comprising a chambered casing structure having an inlet opening and an outlet opening, an inlet conduit secured within said inlet opening for delivering steam and water into the chamber of said casing structure, a blow-off pipe connected to said inlet conduit adjacent said inlet opening, valve mechanism for controlling the flow of water through said outlet opening, an inverted, generally cup-shaped bucket arranged within said chamber for actuating said valve mechanism, and a strainer for said inlet opening arranged within said chamber and having an inverted generally cup-shaped body portion extending into the space within said bucket and also having a laterally extending annular base portion secured to said casing structure bottom wall around the inlet opening thereof.

In testimony whereof I hereby affix my signature.

LESLIE P. STRONG.